Sept. 26, 1933.  J. H. ST. MARTIN  1,928,511
BUOYANT PROPULSION DEVICE
Filed May 9, 1932

Inventor
J. H. St. Martin
By Miller & Miller
Attorneys

Patented Sept. 26, 1933

1,928,511

UNITED STATES PATENT OFFICE 1,928,511

BUOYANT PROPULSION DEVICE

Joseph H. St. Martin, West Palm Beach, Fla.

Application May 9, 1932. Serial No. 610,252

4 Claims. (Cl. 115—63)

This invention relates to a buoyant propulsion device and has for an object to provide an improved buoyant propulsion means for a vehicle or boat, which may be used on either land or water.

A further object of this invention is to provide an improved propulsion mechanism wherein the propulsion mechanism is an endless belt device, each unit of the belt providing buoyancy per se.

A further object of this invention is to provide an improved buoyant propulsion mechanism wherein several units of the propulsion belt or tread will, when in use in water, serve to entrap air therebetween to thus increase the buoyancy effect.

Still a further object of this invention is to provide a propelling mechanism made up of a series of double units consisting of one air tight cone and one inverted cone having an open base adjacent the apex of the air tight cone, which inverted cone will serve to entrap air therein.

Still a further object of this invention is to provide an improved buoyant propulsion mechanism which may be used not only on land or in water, but also in very shallow waters over marine vegetation or shallows.

Yet a further object of this invention is to provide an improved buoyant propulsion mechanism which may be used with any suitable type of chassis and motor power.

Figure 1:
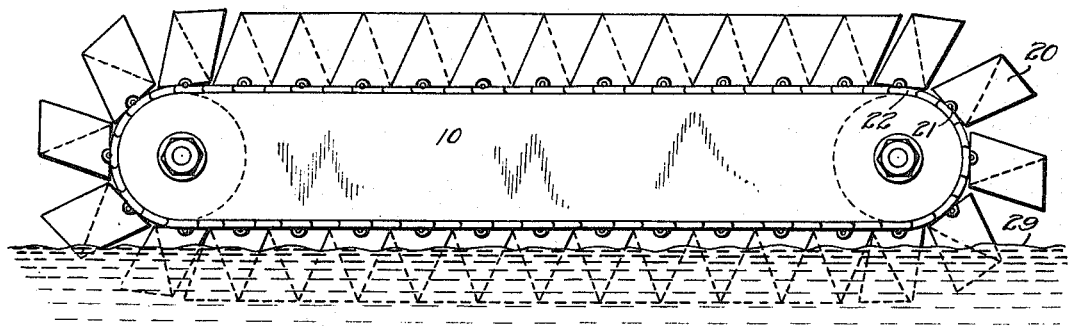
Figure 2:
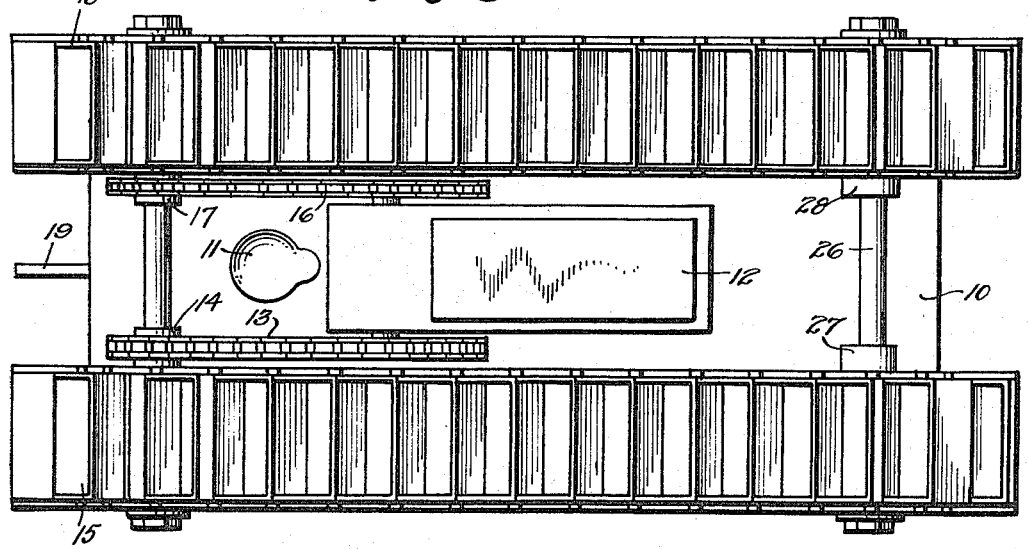
Figure 3:
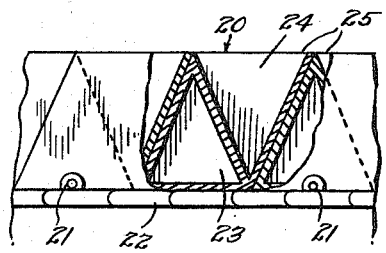

With the foregoing and other objects in view, as will hereinafter become apparent, this invention comprises the constructions, combinations and arrangements of parts, hereinafter set forth, disclosed and shown on the accompanying drawing. In this drawing, Figure 1 is a side elevation of the vehicle showing how the cones entrap air when dipping in water, Figure 2 is a plan view of same, and Figure 3 is an enlarged fragmentary view of several cones showing clearly the arrangement of said cones, one being sealed and air tight while the inverted cone is open on top only.

There is shown at 10 a chassis on which may be mounted a seat 11 and a power device schematically shown at 12, the power device being connected by a chain or equivalent means 13 to a rear axle sleeve 14 to one of the treads 15, there being a similar chain 16 connected to the rear axle sleeve 17 of the other tread 18.

By an appropriately controlled throttle means in the power supply 12, either tread 15 or 18 may be caused to rotate more rapidly than the other tread, thereby supplying a steering means on either land or water. Alternatively, a rudder 19 may be provided for steering when in water. Each tread 15 and 18 is composed of a plurality of tread members 20 hinged at 21 to an endless belt 22, thereby permitting the tread members to pass around the axle at either end of the vehicle. Each tread member 20 is composed of an air tight cone 23 and an open cone 24, it being observed that the open cone 24 is inverted with respect to the air tight cone 23, and that the open cone 24 is opened at its base 25.

When the tread member is in water, the open base 25 will serve to entrap air therein as it passes below the water level, thus increasing the buoyancy and propulsion effect of the device. A front axle 26 may be provided, having idle shafts 27 and 28 thereon allowing one tread to move faster thereover than the other when so desired.

It will be understood that the chassis member schematically shown at 10 is merely a conventional representation of any suitable vehicle or boat body that might be designed and placed thereon, but any other suitable forms may be given to the body of the vehicle or boat, which is to be carried by this improved propulsion device.

In operation, the tread members 20 serve to provide the buoyant power for the device, they being made of a size appropriate to the weight that is to be placed thereon. The tread members 20 will be preferably wedge shaped as shown although any other suitable shape may be provided that performs substantially the same functions, that is, providing buoyancy per se when traveling in water 29 and which will also serve to entrap a pocket of air in the inverted cone 24, thus increasing the buoyancy. Obviously, the ends of the wedges may be frustrum shaped instead if desired, especially if the vehicle is to travel on land more than the usual amount.

When traveling on land the edges of the tread member 20 will support the vehicle thus allowing the vehicle to travel either on land or in water. It may be easily steered when on land by allowing one of the treads to operate faster or slower than the other of the treads.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A buoyant propulsion device for a vehicle, vessel or the like, comprising a plurality of tread members, each tread member comprising a double unit, each unit being substantially rigid and wedge shaped in cross section, one unit being inverted with relation to the other unit.

2. A buoyant propulsion device for a vehicle, vessel or the like, comprising a plurality of tread members, each tread member comprising a double unit, each unit being substantially rigid and wedge shaped in cross section, one unit being inverted with relation to the other unit, one of said units being hollow and containing air, and the other of said units having an open base serving to entrap air therein.

3. A propulsion device for vehicles, vessels or the like, comprising an endless belt, a plurality of tread members pivotally connected to said endless belt, each of said tread members being buoyant per se, each of said tread members comprising an air tight wedge shaped unit, and an open base inverted wedge shaped unit, said tread members being adapted to propel said vehicle on land or water.

4. A propulsion device for vehicles, comprising a plurality of endless belts, a plurality of buoyant tread members pivotally connected to each endless belt, each buoyant tread member comprising a pair of wedge shaped units inverted one to the other, one of said wedge shaped units being air tight, the base of said air-tight unit being secured to said endless belt and the other of said buoyant units having an open base for entrapping and compressing air therein when said vehicle is used on water, the apex of said open unit being nearest said belt.

JOSEPH H. ST. MARTIN.